United States Patent
Armistead et al.

(10) Patent No.: US 6,529,959 B1
(45) Date of Patent: *Mar. 4, 2003

(54) METHOD AND APPARATUS FOR AUTOMATIC ROUTING OF CIRCUIT SWITCHED DATA CONNECTIONS BASED UPON STORED BEHAVIORAL INFORMATION

(75) Inventors: R. Ashby Armistead, Los Altos, CA (US); Robert L. Sargent, Knoxville, TN (US); Tod W. Hays, Austin, TX (US)

(73) Assignee: Cisco Technology, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,862

(22) Filed: May 3, 2001

Related U.S. Application Data

(63) Continuation of application No. 09/225,897, filed on Jan. 4, 1999, now Pat. No. 6,260,071.

(51) Int. Cl.[7] .............................................. G06F 13/00
(52) U.S. Cl. ...................................................... 709/238
(58) Field of Search ................................ 709/238, 245, 709/250, 223, 224

(56) References Cited

U.S. PATENT DOCUMENTS

| | | | | |
|---|---|---|---|---|
| 4,506,358 A | * | 3/1985 | Montgomery | 370/409 |
| 4,991,169 A | | 2/1991 | Davis | |
| 5,918,019 A | * | 6/1999 | Valencia | 709/227 |
| 5,931,928 A | * | 8/1999 | Brennan et al. | 710/68 |
| 6,005,846 A | * | 12/1999 | Best et al. | 370/264 |
| 6,073,176 A | | 6/2000 | Baindur et al. | |
| 6,260,071 B1 | * | 7/2001 | Armistead et al. | 709/238 |

\* cited by examiner

*Primary Examiner*—Robert B. Harrell
(74) *Attorney, Agent, or Firm*—Marger Johnson & McCollom P.C

(57) ABSTRACT

A method and apparatus for automatic routing of multi-link circuit switched connections are shown. A routing processor monitors the behavioral characteristics of a previous connection from an originating client and stores data relating to the characteristics of the previous connection. In particular, data is stored regarding the previous connection which is not available until after call completion of the previous connection. When the originating client initiates a subsequent connection, the routing processor retrieves the data relating to the behavioral characteristics of the previous connection and routes the subsequent connection along a route which is advantageous to serving the behavioral characteristics of the subsequent connection.

17 Claims, 7 Drawing Sheets

METHOD AND APPARATUS FOR AUTOMATIC ROUTING OF CIRCUIT SWITCHED DATA CONNECTIONS BASED UPON STORED BEHAVIORAL INFORMATION

This application is a continuation of and claims priority from prior application Ser. No. 09/225,897, filed Jan. 4, 1999, now U.S. Pat. No. 6,260,071, issued on Jul. 10, 2001.

FIELD OF THE INVENTION

The present invention relates generally to automatic routing selection for data connections through multiple transmission lines on network access servers (NASs).

BACKGROUND OF THE INVENTION

A network access server (NAS) box typically provides dial-up internet services to users of the internet. A user dials into the access server box in order to be connected to the internet. The access server box transmits and receives data through the public switched telephone network (PSTN) over channelized transmission facilities, such as a BRI, T1, E1, T3, SONET or SDH lines.

Multi-link PPP (MLP) is a method for obtaining higher transmission bandwidth by sending data through separate serial channels using a point-to-point protocol (PPP) and then reassembling the data at a termination point of the serial channels. MLP is often applied in integrated services data network (ISDN) which use multiple B channels. Another application of MLP is using multiple modem connections in parallel to obtain greater bandwidth than that available from a single modem.

An MLP session does not require a high level of resources from the NAS or router box for support so long as all the PPP connections for the separate serial channels of the MLP session terminate on the same router box. However, a large NAS will typically be constructed from multiple remote access concentrators (RACs) each having its own transmission facilities connecting it to the PSTN. An example of an RAC is a network router with dial-in facilities for interfacing with the PSTN. If the multiple dial-up connections are terminated on different RACs serving the same NAS, then a multi-chassis multi-link PPP (MMP) is required to support the multiple link connection. In the case of an MMP session, the multiple PPP sessions of the MMP must be tunneled from different RACs to a single RAC in the NAS in order to terminate the MMP session.

MMP sessions can be expensive in terms of router resources and support for MMP can present a serious problem when scaled to large NAS systems having a large number of RACs. The MMP support problem, in some cases, drives network design to use a single large central RAC for each NAS system. However, the cost advantages to being able to scale many small RAC blocks in order to obtain a larger system are then lost.

Internet service providers (ISPs) typically have a large pool of customers, where only a fraction of the total pool is actively using the communications infrastructure of the ISP at any given time. ISPs therefore typically oversubscribe their communications equipment (i.e. modems, ISDN lines, T1/E1 facilities) in order to take advantage of the fact that a smaller proportion of their total users are active during any given period. The equipment which serves subscribers is therefore structured to have a concentration ratio which represents the proportion of subscriber connections to transmission facilities. The concentration ratio is selected so as to cost-effectively provide a reasonable quality of service to the subscribers with the least number of transmission facilities. Thus, the concentration rate can be relatively high for a pool of low usage users, but must be much lower for a pool of high usage users.

In the course of terminating calls to a given NAS system, a switch serving the NAS system will typically attempt to distribute the terminating calls as uniformly as possible across the multiple transmission facilities (i.e. T1/E1 facilities) connected to the NAS system on a next available basis. As a result, in a multi-chassis NAS, the probability of the multiple serial channels for an MMP session being distributed across transmission facilities serving different chassis of the NAS can become quite high.

In addition, the bulk of the pool of customers will not set up a multi-link session. Multi-link calls typically originate from a sub-set of customers who have specialized hardware needed to support multi-link connections and have paid for multi-link service.

Signaling System 7 (SS7) is an out-of-band common channel signaling system that is typically used to perform the signaling involved in setting up calls between switches in the publicly switched telephone network (PSTN). The SS7 protocol messages include the originating or source telephone number for a call, the terminating or destination telephone number as well as information regarding the telephone circuits to be used by the call. For instance, a phone call will originate and send out a request to terminate the call to a destination. The switch receiving the origination request will send an SS7 message into the PSTN requesting routing and termination on the switch serving the destination. The PSTN will determine the connection between the originating and terminating switches including sending an SS7 message requesting a timeslot and facility for the call to terminate on the destination switch. Other common channel signaling (CCS) protocols exist which are used for call routing.

FIG. 1 illustrates an example of a multi-chassis multi-link session in a conventional network architecture 100. A customer premise equipment (CPE) 110 is served by switch 120 which is part of the PSTN 10 and which communicates with PSTN 10 through trunk line 122. An IP or ATM network 150 is served by NAS 140 which consists of multiple RACs 142 and 146 which communicate via intra-chassis communication link 144. NAS 140 is connected to switch 130 of the PSTN 10 via multiple T1 facilities 132–136. The ellipses between T1 facility 132 and T1 facility 136 indicate that a large number of T1 facilities may be used to connect a NAS to the PSTN 10.

An example of call establishment for a multi-link connection in the architecture 100 will now be described. Multi-link calls can take a variety of forms including an ISDN basic rate interface (BRI) having a pair of B channels having the same source identifier, i.e. ISDN number, or an asynchronous multi-link originating from modems having different source phone numbers. The function of the conventional architecture of FIG. 1 is discussed in the context of an ISDN BRI connection, but the call establishment scenario shown is also relevant to other types of multi-link connections.

Typically, a multi-link call will originate with a first link and then add a second link as needed. A first data link connection originates on CPE 110 which sends an 1.451/Q.931 call set-up request message over a D channel to switch 120. The set-up requests a first B channel B1 connected to switch 120 and designates a destination address in IP or ATM network 150 as the destination of the call. Switch 120 determines that the destination of the call is served by another switch in PSTN 10 and identifies the first exchange in the route through PSTN 10 toward the destination switch 130 serving NAS 140. NAS 120 then sends an initial address SS7 message to the first exchange in PSTN 10 which contains the ISDN number of the destination party (i.e. the destination address in 1P or ATM network 150), the type of connection (e.g. 64 Kbps), and the identity of the selected physical circuit to the first exchange (i.e. a channel on T1 facility 122).

Exchanges within PSTN 10 then route the call to the terminating NAS 140 based upon the ISDN number of the destination address in IP or ATM network 150. At each intermediate exchange in PSTN 10, the incoming SS7 call set-up message is received and analyzed. Based upon the destination address of the call and other routing information, the intermediate exchange makes a routing decision, selects a link to the next exchange, sets up a connection between the incoming and outgoing links and forwards the SS7 call set-up message to the next exchange. This process continues until the SS7 call set-up message arrives at the terminating switch 130 connected to NAS 140.

Switch 130 will select an idle channel on one of the T1 facilities 132–136 serving NAS 140 as the circuit for the connection to NAS 140. The T1 facility and timeslot will typically be selected based upon a distribution algorithm. Examples of the distribution algorithm are round-robin, least-recently-used, first-in-first-out or a uniform distribution algorithm. In the present example, a channel on T1 facility 132 is selected for the first B channel connection B1 which terminates on RAC 142 of NAS 140.

NAS 140 identifies the destination address in IP or ATM network 150 as the called party based upon the ISDN number and forwards a set-up message to the destination address in network 150. At this point, a first PPP session has been established in RAC 142 for the first B channel B1 from CPE 110. An ALERT message will be sent from the first PPP session in NAS 140 through switch 130 and PSTN 10 to switch 120. Switch 120 then returns an address complete message to CPE 110 which acknowledges that the PPP session for the first B channel connection B1 has been established.

The set-up of a PPP session for a second B channel B2 for a multi-link session connection to network 150 proceeds in much the same manner as that described above for the first B channel B1. However, due to the distribution algorithm in the final exchange of PSTN 10, a channel on a different T1 facility will frequently be selected for the B2 channel. In the example shown, T1 facility 136 is selected for the B2 channel of the multi-link connection and a second PPP session is established in RAC 146. However, the PPP session for the first B channel B1 from CPE 110 has been established in RAC 142. Thus, the PPP session for the second B channel B2 must be tunneled from RAC 146 across intra-chassis communication link 144 to RAC 142 in order to establish the multi-link protocol session to serve the connection to CPE 150.

Thus, the multi-link session described above is an MMP session which requires resources on both RAC 142 and RAC 146 as well as intra-chassis communication link 144 when the multi-link connection could be more efficiently serviced through an MLP session in RAC 142 alone. This results in inefficient use of facilities which requires a lower concentration ratio in the structure of NAS 140 in order to provide an acceptable level of service quality to the subscribers served by NAS 140. Consequently, the cost for providing service to users is higher than necessary.

Accordingly, a need remains for more efficient use of facilities in NASs in supporting MLP sessions.

SUMMARY OF THE INVENTION

An embodiment of a call control system for routing multi-link connections, according to the present invention, is composed of a communications network including first and second switches. The first switch is configured to support a multi-link connection with an originating client and requests a connection by sending a connection set-up message into the communications network in response to a request from the originating client for each link of the multi-link connection. The connection set-up message identifies the originating client and a terminating client. A server is coupled to the second switch of the communications network and is configured to support a multi-link connection with the terminating client. The server has multiple communication devices where each communication device is coupled to the second switch through a corresponding transmission facility. A routing processor coupled to the communications network is configured to store a data entry identifying the originating client as a potential source of a multi-link connection. The routing processor receives each connection setup request from the first switch, and, responsive to each connection set-up request from the originating client, searches for the data entry for the originating client. If the data entry is found, the routing processor directs routing of all connections from the originating client to the terminating client to a single one of the communication devices of the server.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 2:
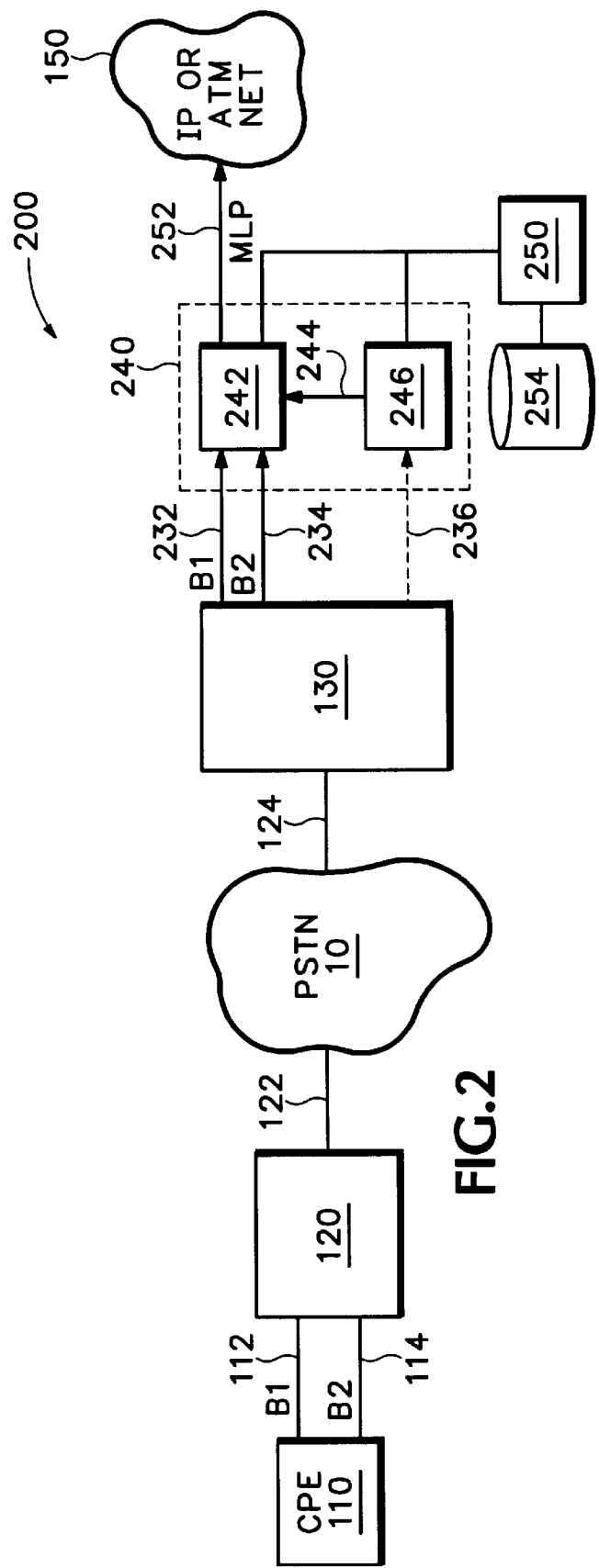
FIG. 2 is a functional block diagram illustrating an embodiment of a connection control system according to the present invention in the context of an ISDN BRI multi-link connection.

Referring now to FIG. 2, an embodiment of a network access server 240 according to the present invention is shown in an architecture 200. CPE 110 is connected to switch 120 which is connected to PSTN 10 through trunk facility 122. Network 150 is served by NAS 240 which consists of multiple RACs 242 and 246 which communicate via intra-chassis communication link 244. NAS 240 is connected to switch 130 of the PSTN 10 via multiple T1 facilities 232, 234 and 236. NAS 240 is also connected to routing processor 250 which maintains database 254.

Routing processor 250 monitors connections from clients served by NAS 240 and detects multi-link connections for clients served by NAS 240. However, the information which identifies a connection as part of a multi-link connection is typically not available until after a connection has been completed. For instance, it is typically not clear to NAS 240 that a multi-link connection is being established between CPE 110 and network 150 until a multi-link point-to-point protocol session has been established in NAS 240. When a multi-link connection is detected, processor 250 will store a data entry in database 254 which identifies connections from the originating client, CPE 110, of the multi-link connection as the source of multi-link connections.

Figure 1:
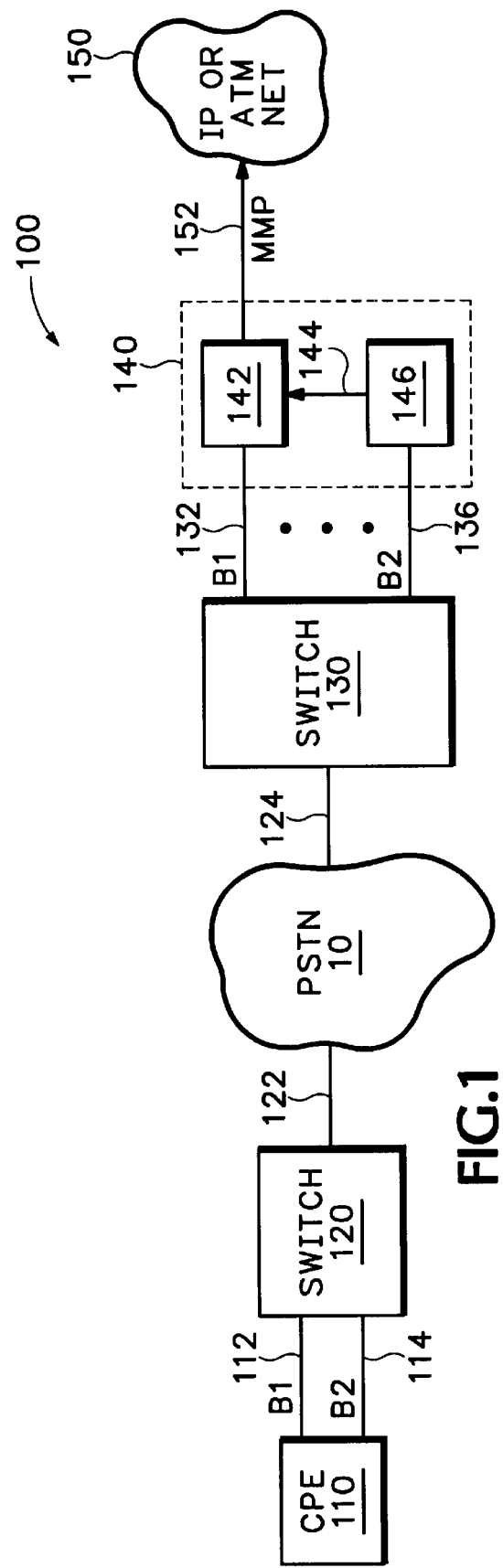
FIG. 1 is a functional block diagram illustrating an MMP session in a conventional network architecture.

Call establishment in architecture 200 proceeds much the same way as in architecture 100 described above and the example illustrated in FIG. 2 follows the example illustrated in FIG. 1. An ISDN data connection originates on the originating client, CPE 110, which sends an 1.451/Q.931 set-up request message over a D channel to switch 120. The set-up requests a connection on a first B channel B1 connected to switch 120 and designates a destination address in network 150 as the destination of the call.

Switch 120 determines that the destination of the call is on another switch of PSFN 10 and identifies the first exchange in the route within PSTN 10 toward the destination switch 130.

SWITCH 120 then sends an initial address SS7 message to the first exchange in PSTN 10 which contains the ISDN number of the originating client (i.e. CPE 110), the ISDN number of the terminating client (i.e. the address on network 150), the type of connection (e.g. 64 Kbps), and the identity of the selected physical circuit to the first exchange (i.e. a channel on trunk facility 122).

The call will be routed through PSTN 10 to terminating switch 130 which serves NAS 240. Switch 130 will employ a selection algorithm to select an idle channel on one of the facilities 232–236 serving NAS 240. Switch 130 then sends an SS7 (or other common channel signaling protocol) termination request to NAS 240 requesting the selected channel. In the example shown, the first B channel connection B1 is established on facility 232 to RAC 242 of NAS 240.

When NAS 240 receives the SS7 termination request, it forwards the message to routing processor 250. Routing processor 250 then searches database 254 for an entry for the ISDN number of the originating client, i.e. CPE 110. (Identifying indicia other than the ISDN number that are available in the call set-up request can be used to identify the originating client and store data.) Assuming that CPE 110 has previously been involved in a multi-link connection, routing processor 250 will find an entry corresponding to CPE 110. The routing processor 250 will then send a message to NAS 240 identifying the call set-up request from CPE 110 as a potential multi-link connection.

NAS 240 is a multiple chassis NAS composed of multiple RACs 242 and 246. Upon receiving the call set-up request and the multi-link message from the routing processor 250, NAS 240 will determine which of the RACs 242 and 246 contains the PPP session for the first B channel connection B1 for the source ISDN number, i.e. CPE 110, which is RAC 242 in the example shown. NAS 240 then broadcasts a message to all RACs in NAS 240 instructing them to reject call set-up requests originating from the ISDN number of CPE 110 that request a facility other than one of the facilities which couple RAC 242 to PSTN 10, i.e. facility 232 or 234. In other words, NAS 240 will only accept a termination request that specifies facility 232 or 234 which directly couple RAC 242 to PSTN 10.

When CPE 110 originates a second B channel connection B2, the call set-up request will route through PSTN 10 to switch 130. Switch 130 will then attempt to terminate the second connection to NAS 240 using the facility selection algorithm. In the example of FIG. 2, terminating switch 130 first attempts to terminate the second B channel connection on facility 236. This request is rejected by RAC 246 of NAS 240 because RAC 246 was instructed to reject all termination requests from CPE 110. Switch 130 next attempts to terminate on facility 234 connected to RAC 242. RAC 242 accepts the termination request and a multi-link PPP (MLP) session is established for both B channels B1 and B2. The MLP connection then transmits the data received on both B channel connections onto network 150.

In the embodiment of FIG. 2, the routing processor 250 is shown as a device which is physically separate from NAS 240. However, the function of routing processor 250 can be embedded in NAS 240 and distributed in the RACs of NAS 240.

Figure 3:
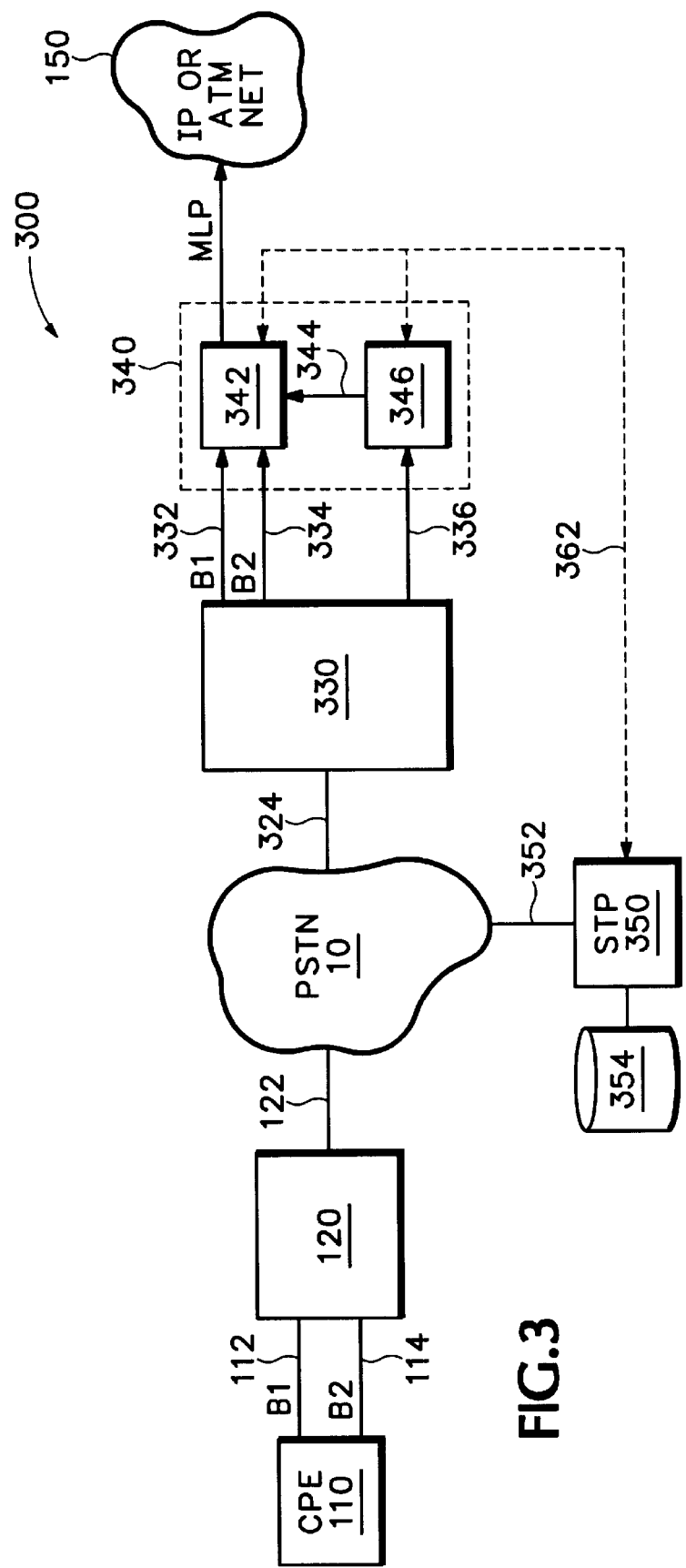
FIG. 3 is a functional block diagram illustrating another embodiment of a connection control system according to the present invention in the context of an ISDN BRI multi-link connection.

The function of routing processor 250 can also be located in the PSTN 10. FIG. 3 illustrates an embodiment of the present invention where the multi-link connection database communication and control is located in a signal transfer point (STP) of PSTN 10.

FIG. 3 shows a connection control system 300 which includes routing processor 350 which is connected to PSTN 10 through signaling link 352. Routing processor 350 is a signaling transfer point (STP) for the common channel signaling system (SS7 in this example) of PSTN 10 and receives the signaling messages from switch 120 to switch 330 which serves NAS 340. Routing processor 350 monitors connections from clients served by NAS 340 and receives information on multi-link connections on NAS 340.

Because routing processor 350 is a STP, it receives the SS7 message traffic for connections from clients served by switch 120. The routing processor 350 can detect some types of multi-link connections from clients served by NAS 340, such as ISDN connections having multiple active connections originating from the same source ISDN number and destined for the same destination ISDN number. However, in some situations, such as asynchronous multi-link connections which originate from modems having different originating phone numbers, the information which identifies a connection as part of a multi-link connection will typically not available until after a connection has been completed. With asynchronous multi-link connections, NAS 340 must identify the connection as a multi-link connection and notify the routing processor 350 with the appropriate information, such as the source phone numbers for each connection, via a message over communication link 362.

When a multi-link connection is detected, processor 350 will store a data entry in database 354 which identifies connections from the originating client of the multi-link connection as the source of multi-link connections. In the case of asynchronous multi-link connections, all the source phone numbers will be stored in database 354 as a set.

When CPE 110 generates an origination, the routing processor 350 will receive the call set-up request sent out from switch 120 with the ISDN number of CPE 110. Routing processor 350 then searches database 354 for an entry for the ISDN number of the originating client. (Identifying indicia other than the ISDN number that are available in the call set-up request can also be used to identify the originating client and store data.) Assuming that CPE 110 has previously been involved in a multi-link connection, routing processor 350 will find an entry for CPE 110. The routing processor 350 will then send a multi-link notification message over communication link 362 to NAS 340 identifying the calls involving CPE 110 from switch 120 as being part of a potential multi-link connection.

Note that communication link 362 can take a number of forms. The communication link 362 can be a physical communication channel separate from PSTN 10. The communication link 362 can also be incorporated into the common channel signaling system of PSTN 10 where the routing processor 350 and NAS 340 communicate via SS7 messages.

NAS 340 is a multiple chassis NAS composed of multiple RACs 342 and 346. Switch 330 sends a call set-up request to NAS 340 which, through the facility selection algorithm, requests a channel on facility 332 to RAC 342. The call set-up is accepted by RAC 342 and a PPP session is created on RAC 342 for the first B channel call. When multi-link notification message sent from routing processor 350 over link 362 is received by NAS 340, the NAS will broadcast a message to all RACs instructing them to reject call set-up requests originating from the ISDN number of CPE 110 that attempt to terminate on any RAC other than RAC 342. In other words, NAS 340 will only accept a termination request that specifies one of facilities 332 and 334 which directly couple RAC 342 to PSTN 10.

The set-up for a second B channel B2 from CPE 110 for the multi-link session proceeds in much the same manner as that described above for the first B channel B1 of the multi-link connection. However, if switch 330 attempts to connect the second B channel on any RAC of NAS 340 but RAC 342, the connection attempt will be rejected. As a result, the second B channel connection is set-up on facility 334. When the second connection request is received by RAC 342, an MLP session is created which handles both links from CPE 110 to network 150. Thus, both the B1 and B2 connections of the multi-link connection between CPE 110 and network 150 will be routed over through RAC 342 without traffic over the intra-chassis communication link 344.

As discussed above, the routing processor 350 tracks previously established multi-link connections from clients served by switch 120 and stores a data entry in database 354 which identifies connections from the originating client of the multi-link connection as the source of multi-link connections. There are a number of ways that processor 350 can identify a connection as a multi-link connection. One way is to monitor the originating and terminating identifiers in the connection requests from the originating client (CPE 110) to the terminating client (network 150) and detect when there are multiple connections from the same originating client to the same terminating client. An example of this scenario is an ISDN BRI connection wherein two call set-up requests are observed by the processor 350 with the ISDN phone number of the originating client as the source ID and where no intervening disconnect messages are observed. Similarly, two call set-up requests having the ISDN phone number of the terminating client as the termination ID without an intervening disconnect message can also indicate an ISDN BRI connection.

Another way for the routing processor to identify multi-link connections is for the terminating NAS 340 to detect multi-link protocol data on the link between CPE 110 and network 150. The NAS then sends a message notifying the routing processor 350 that a multi-link connection has been established between CPE 110 and network 150.

The method described above for blocking termination on facilities not directly connected to router 342 serving the terminating client network 150 is one way of directing call routing according in the present invention. Common channel signaling systems, such as SS7, also permit selection of the terminating facility in the connection request.

Because routing processor 350 is an STP in PSTN 10, there is another variation in the call routing control system, according to the present invention, for an MLP. In this embodiment of the routing control system, the routing processor 350 also stores data relating to the appropriate facility or facilities to select for a particular terminating client. The routing processor 350 is not only able to identify potential MLP connections, but also able to identify the appropriate facilities for termination of the potential MLP connections. When the routing processor identifies a call set-up request for an MLP connection, it will also retrieve the identity of the appropriate facilities from the database 354 and forward this information along with the call set-up request to switch 330. Switch 330 will then select a channel on one of the appropriate facilities identified by routing processor 350 in its call connection request to NAS 340.

Figure 4:
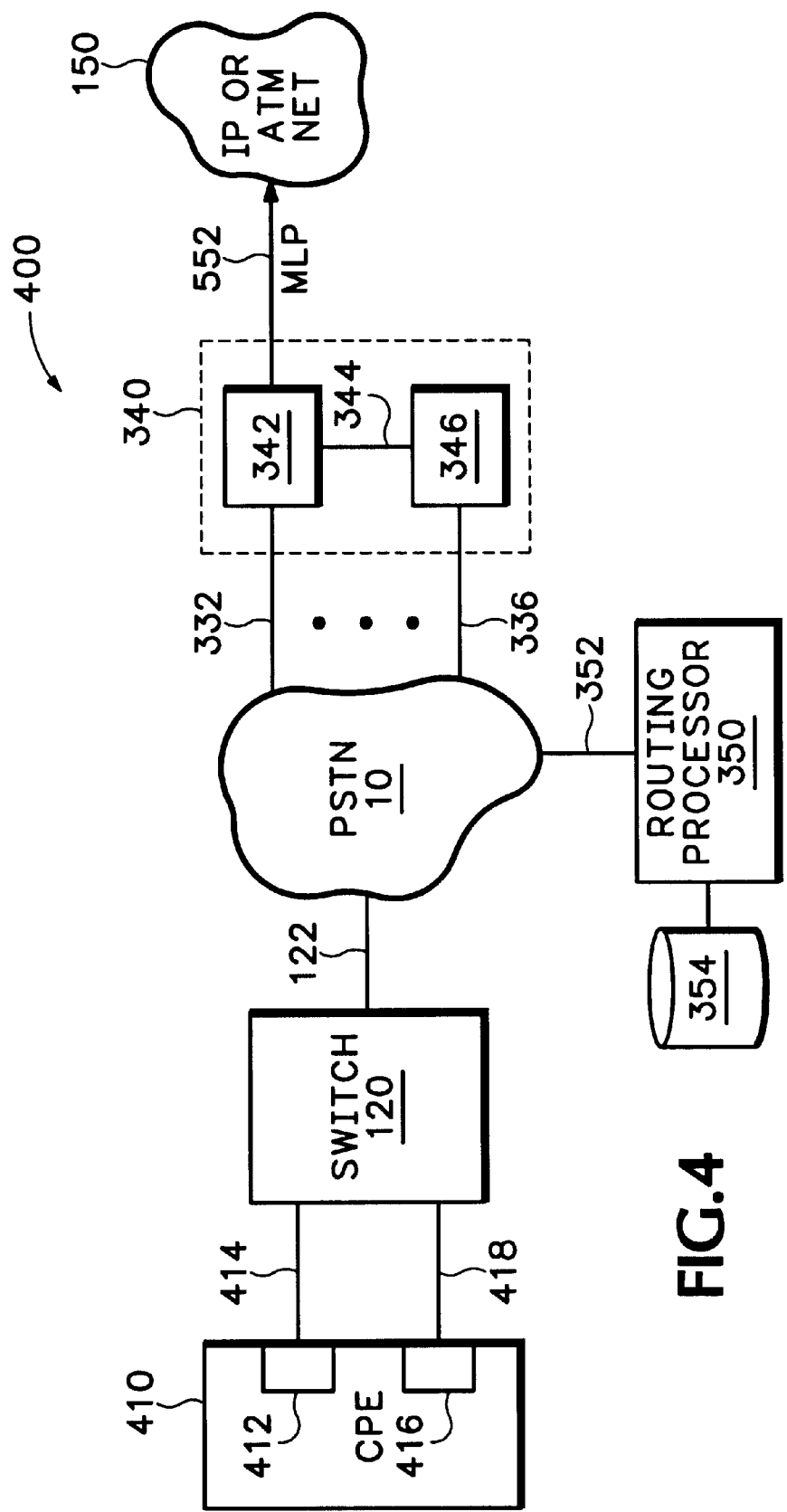
FIG. 4 is a functional block diagram illustrating an embodiment of a connection control system according to the present invention in the context of an asynchronous multi-link connection.

As mentioned above, the present invention can also be applied to asynchronous multi-link connections, as illustrated in the architecture 400 in FIG. 4. An asynchronous multi-link connection involves connections from separate originating phone numbers. CPE 410 includes modems 412 and 416 which can call switch 120 over telephone lines 414 and 418 respectively. Each of modems 412 and 416 has a unique phone number. Thus, the call set-up messages from originating switch 120 to terminating NAS 340 will have different source identifier values. In the present invention, routing processor 350, once it has determined that the connections originating from modems 412 and 416 belong to a single multi-link connection, will store a data set including the phone numbers for each of the modems 412 and 416 identifying them as part of the same multi-link connection. Thus, when the routing processor 350 detects an origination from the phone number of either modem 412 or modem 416, it can identify them as part of a potential multi-link connection and treat them as described above.

Figure 5:
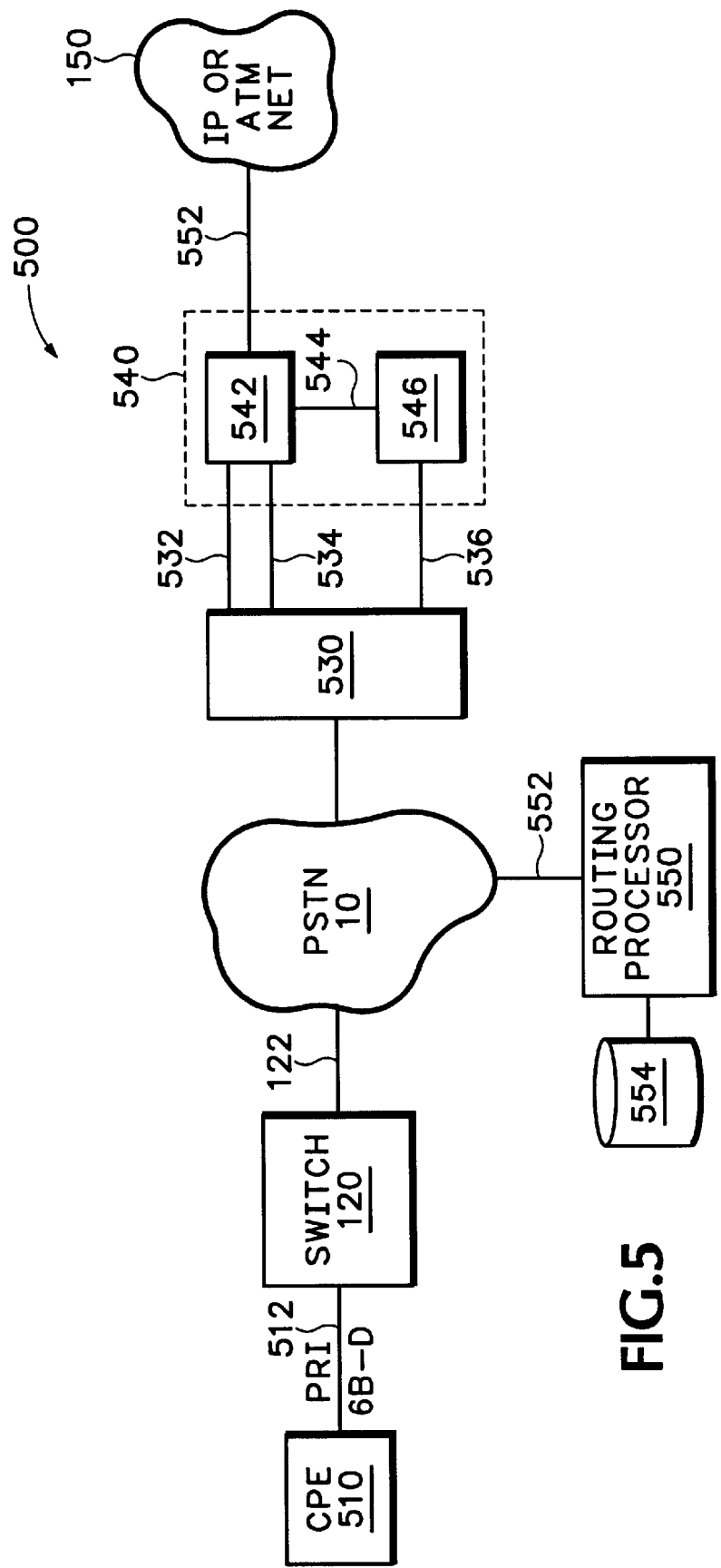
FIG. 5 is a functional block diagram illustrating an embodiment of a connection control system according to the present invention in the context of an ISDN BRI multi-link connection.

A refinement of the present invention involves efficient routing of multi-link connections having a large number of links. FIG. 5 illustrates an example involving an ISDN primary rate interface (PRI) involving an H0 channel 512. For simplicity, the H0 channel 512 is shown as a single line, but it should be understood that an H0 channel consists of six B channels plus a D channel.

Connections for each B channel of H0 512 are established in the same manner as described above with respect to the example shown in FIG. 2. Call set-up requests are sent from CPE 510 to SWITCH 120 over the D channel of the H0. Each call set-up request is then forwarded from SWITCH 120 into PSTN 10 over the common channel signaling system and a connection is established to terminating switch 530.

Note that RAC 542 of NAS 540, which serves network 150 via H0 channel 552, is served by two facilities 532 and 534. In this embodiment, routing processor 550, responsive to previous H0 connections between CPE 510 and network 150, has stored a data entry which describes the typical number of links from CPE 510 as being six. Thus, in addition to notifying NAS 540 that call set-up messages from CPE 510 are likely to be associated with a multi-link connection, routing processor 550 also notifies NAS 540 that the number of links for the multi-link connection is likely to be six.

NAS 540 responds by reserving six timeslots on facilities 532 and 534 connected to RAC 542 for the H0 connection from CPE 510. NAS 540 will block connections from other originating clients in order to allow the H0 connection from CPE 510 to network 150 to be set-up directly through RAC 542. The technique of the present invention can be applied to other multi-link channels such as H11 (23B+D) and H12 (30B+D). The technique of the present invention can also be applied to on-demand B channels where routing processor 550 tracks past behavior of the connections between CPE 510 and NETWORK 150 and maintains a data entry describing the typical number of on-demand B channels for the connection.

The technique of the present invention can also be applied to applications other than multi-link connections. The principle at work in the present invention is to track characteristics of connections which cannot be determined until after call completion and which can be used to more efficiently route the connection and associate them with the originating client. For instance, originating clients which tend to establish links which are characterized by data compression, data encryption, high bandwidth or particular modem transmission characteristics, can be identified and calls originating from those clients can be identified by routing processor 550. Routing processor 550 then effects efficient routing of the calls to optimize resource utilization in the communications system based upon the link characteristics of previous calls from those clients.

The present invention can also be applied to the control of routing multi-link connections within a large RAC. Large RACs typically provide equipment bays for a variable number of line cards for servicing connections. Line cards can then be added in order to scale the capacity of a large RAC to support the level of data traffic received by the RAC.

Figure 6:
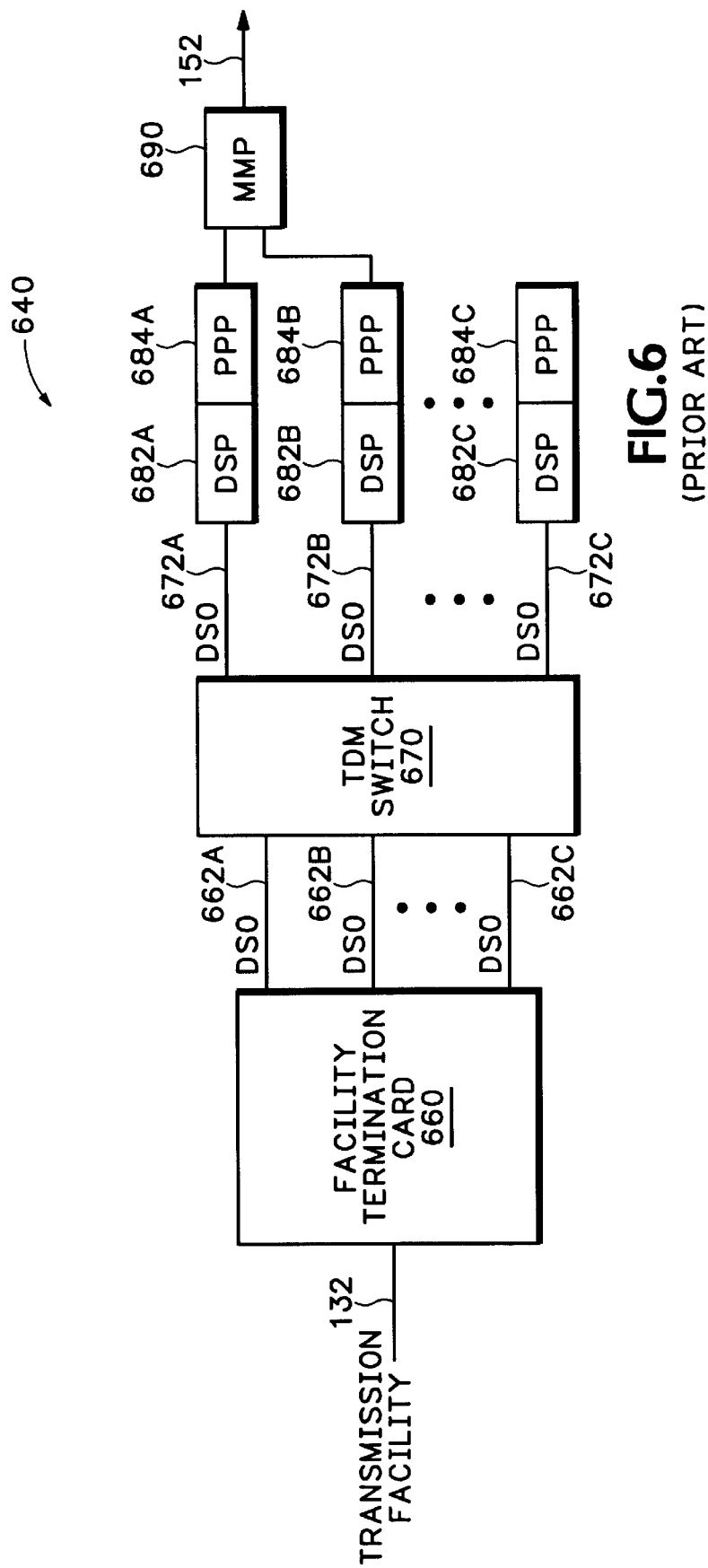
FIG. 6 is a functional block diagram illustrating a conventional large RAC having multiple line cards.

FIG. 6 illustrates an example of a large conventional RAC 640 having multiple line cards designed to service individual PPP connections. A transmission facility 132 serving RAC 640 terminates on a facility termination card 660 which splits out the individual channels, e.g. DSOs, of the transmission facility 132 and inputs each DSO 662A–C to a time division multiplexor (TDM) switch 670. The TDM switch 670 then routes a call received on a DSO 662A–C input from facility termination card 660 to a DSO connection 672A–C to an idle digital signal processor (DSP) 682A–C. The TDM switch 670 will attempt to distribute calls to the DSPs 682A–C using a distribution algorithm, such as round robin, FIFO, Poisson, etc.

Each DSP 682A–C is capable of terminating a dial-in connection for an incoming call and is connected to an associated PPP processor 684A–C which supports the PPP connection for the incoming call. The combination of a DSP and PPP processor supports a point-to-point dial-in connection for the incoming call. While DSP devices are shown in FIG. 6, the DSPs can be replaced by analog modems for terminating calls from modem devices, to support an asynchronous multi-link connection, or by HDLC hardware or software, to support an ISDN connection.

In the case of a multi-link connection, if the different connections terminate on different line cards, then an MMP session is required to support the connection. An MMP session can be supported by either a centralized MMP processor, as shown in FIG. 6, or by MMP software executing in the PPP processor of one of the line cards. In FIG. 6, the PPP sessions for each of the links are combined in a centralized MMP processor 690 which combines the data from the PPP sessions for output on a link 152 to a network. This requires the addition of the MMP processor 690. If the MMP session is supported by one of the PPP processors 684A–C, the other PPP sessions of the multi-link connection must be tunneled to the PPP processor where the MMP session resides.

In the case of a centralized MMP processor, the MMP function is not scalable for the traffic encountered by the RAC. In the case of either a centralized processor or line cards which support MMP, the MMP session requires greater resources for support than an MLP session executing in a single line card.

Figure 7:
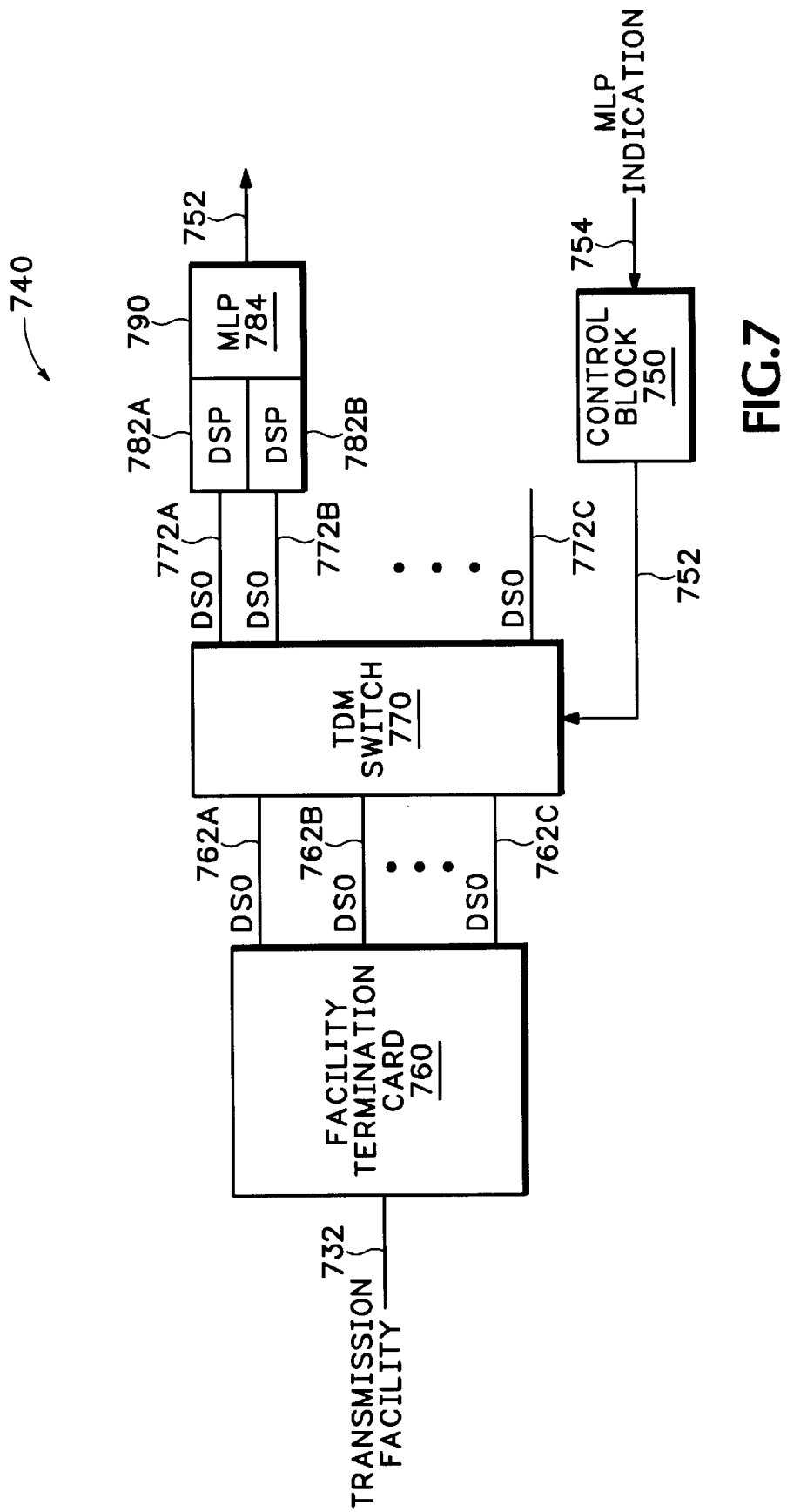
FIG. 7 is a functional block diagram illustrating an embodiment of a large RAC where multiple links of a multi-link connection are routed according to the present invention to a single line card.

Line cards can also be loaded with MLP software, or other specialized functions, to support particular types of connections, such as multi-link connections. In order to establish an MLP session in a line card, it is necessary to route the calls for the multiple links to the same line card. FIG. 7 illustrates an embodiment of a large RAC 740 having an MLP line card 790 which supports an MLP session. The routing system of the present invention can be employed to route multi-link connections to the MLP line card 790.

A transmission facility 732 serving RAC 740 terminates on a facility termination card 760 which splits out the individual channels, e.g. DSOs, of the transmission facility 732 and inputs each DSO 762A–C to a time division multiplexor (TDM) switch 770. The TDM switch 770, routes each call received on a DSO 762A–C input from facility termination card 760 to a DSO connection 772A–C connected to an idle DSP. However, DSP devices 782A and 782B are part of MLP line card 790 and are connected to MLP processor 784 that serves a link 752 to a network. MLP processor 784 can support an MLP session for multiple links provided that the links are terminated on a DSP connected to the MLP line card 790. TDM switch 770 receives control input 752 from control block 750. Control block 750 receives an MLP indication 754 from a routing processor, such as processor 550 in FIG. 5, which identifies multi-link connections in the manner described above. Control block 750 maintains information that identifies the DSOs 772A and 772B serving MLP line card 790. Control block 750, through control link 752 to TDM switch 770, can also direct the TDM switch 770 to terminate an incoming call on one of DSOs 762A–C to a selected one of DSOs 772A–C.

When control block 750 receives an MLP indication that an incoming call is a potential multi-link connection, it directs switch 770 to terminate the call on one of the DSOs 772A and 772B serving DSPs 782A and 782B of MLP line card 790. Control block 750 also directs switch 770 to reserve the remaining one of DSOs 772A and 772B to service a subsequent link of the multi-link connection. When a second call arrives for the subsequent link, control block 750 notifies switch 770 and the switch connects the call to the remaining DSO. Thus, MLP processor 784 maintains an MLP session for both links of the call with fewer resources than are required in the conventional RAC 640 of FIG. 6.

As mentioned above, the routing processor function can be incorporated into an RAC. If the routing processor is resident in the RAC, then the routing processor function and control block fiction can also be consolidated in a processor within the RAC.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A routing processor adapted to direct a multi-link session, comprising:
   means for monitoring establishment of a first communication link between a source client and a termination client through a first terminating device;
   means for collecting termination connection characteristic information regarding the first communication link after the first communication link is terminated;
   means for detecting a second communication link from the source client; and
   means for directing termination of the second communication link to the first terminating device responsive to the connection characteristic information for the source client before terminating the second communication link.

2. The routing processor of claim 1 wherein the first communication link is a multi-link point-to-point connection and the connection characteristic information is a multi-link point-to-point indicator and wherein the means for directing termination of the second communication link includes:
   means for identifying the first terminating device where a first PPP session of the first communication link resides; and
   responsive to a request for a second communication link, terminating the second communication link on the first terminating device.

3. The routing processor of claim 2 including:
   means for sending a signaling channel message requesting termination on a transmission facility serving the first terminating device.

4. The routing processor of claim 2 including:
   means for blocking termination requests for the second communication link on any transmission facility that does not directly serve the first terminating device.

5. The routing processor of claim 2 wherein: the means for monitoring a first call originating from the subscriber line includes identifying a connection originating at a second subscriber line as the second link of the multi-link point-to-point call; and
   the connection characteristic information regarding the first call includes information identifying the second subscriber line as the second link of the multi-link point-to-point call on the first subscriber line.

6. The routing processor of claim 1 including means for retrieving the connection characteristic information before terminating the second communication link.

7. The routing processor of claim 1 including means for storing the connection characteristic information.

8. A routing processor adapted to direct a multi-link session, comprising:
   a monitor circuit adapted to monitor establishment of a first communication link between a source client and a termination client through a first terminating device;
   a collection circuit adapted to collect termination connection characteristic information regarding the first communication link after the first communication link is terminated;
   a memory adapted to store the connection characteristic information;
   a detection circuit adapted to detect a second communication link from the source client;
   a retrieval circuit adapted to retrieve the connection characteristic information before terminating the second communication link; and
   a control circuit adapted to direct termination of the second communication link to the first terminating device responsive to the connection characteristic information for the source client.

9. The routing processor of claim 8 wherein:
   the first communication link is a multi-link point-to-point connection;
   the connection characteristic information is a multi-link point-to-point indicator;
   the control circuit includes:
     an identification circuit adapted to identify the first terminating device where a first point-to-point protocol session of the first communication link resides; and
     responsive to a request for a second communication link, terminating the second communication link on the first terminating device.

10. The routing processor of claim 9 including:
    a transmission circuit adapted to send a signaling channel message requesting termination on a transmission facility serving the first terminating device.

11. The routing processor of claim 9 including:
    a blocking circuit adapted to block termination requests for the second communication link on any transmission facility that does not directly serve the first terminating device.

12. The routing processor of claim 9 wherein:
    the monitor circuit includes an second identification circuit adapted to identify a connection originating at a second subscriber line as the second link of the multi-link point-to-point call; and
    the connection characteristic information regarding the first call includes information identifying the second subscriber line as the second link of the multi-link point-to-point call on the first subscriber line.

13. An article comprising: a storage medium, said storage medium having stored thereon instructions, that, when executed by at least one device, result in:
    monitoring establishment of a first communication link between a source client and a termination client through a first terminating device;
    collecting termination connection characteristic information regarding the first communication link after the first communication link is terminated;
    storing the connection characteristic information;
    detecting a second communication link from the source client;
    retrieving the connection characteristic information before terminating the second communication link; and
    directing termination of the second communication link to the first terminating device responsive to the connection characteristic information for the source client.

14. The article of claim 13 wherein the first communication link is a multi-link point-to-point connection and the connection characteristic information is a multi-link point-to-point indicator and wherein directing termination of the second communication link includes:
    identifying the first terminating device where a first PPP session of the first communication link resides; and
    terminating the second communication link on the first terminating device responsive to a request for a second communication link.

15. The article of claim 14 including:

sending a signaling channel message requesting termination on a transmission facility serving the first terminating device.

16. The article of claim 14 including:

blocking termination requests for the second communication link on any transmission facility that does not directly serve the first terminating device.

17. The article of claim 14 including:

identifying a connection originating at a second subscriber line as the second link of the multi-link point-to-point call; and identifying the second subscriber line as the second link of the multi-link point-to-point call on the first subscriber line.

\* \* \* \* \*

UNITED STATES PATENT AND TRADEMARK OFFICE
CERTIFICATE OF CORRECTION

PATENT NO. : 6,529,959 B1
DATED : March 4, 2003
INVENTOR(S) : Armistead et al.

It is certified that error appears in the above-identified patent and that said Letters Patent is hereby corrected as shown below:

Column 2,
Line 64, "an 1.451/" should read -- an I.451/ --.

Column 3,
Line 8, "in 1P or" should read -- in IP or --.

Column 5,
Line 26, "an 1.451/Q.931" should read -- an I.451/Q.931 --.
Line 32, "of PSFN 10" should read -- of PSTN 10 --.

Column 7,
Line 25, "first 13 channel" should read -- first B channel --.

Column 9,
Line 46, "e.g. DSOs, of" should read -- e.g. DS0s, of --.
Line 47, "each DSO 662A-C" should read -- each DS0 662A-C --.
Line 49, "a DSO 662A-C" should read -- a DS0 662A-C --.
Line 50, "a DSO connection" should read -- a DS0 connection -- .

Column 10,
Line 31, "e.g. DSOs, of" should read -- e.g. DS0s, of --.
Line 32, "each DSO 762A-C" should read -- each DS0 762A-C --.
Line 34, "a DSO 762A-C" should read -- a DS0 762A-C --.
Line 35, "a DSO connection" should read -- a DS0 connection --.
Line 46, "the DSOs 772A" should read -- the DS0s 772A --.
Line 50, "of DSOs 762A-C to" should read -- of DS0s 762A-C to --.
Line 50, "of DSOs 772A-C." should read -- of DS0s 772A-C. --.
Line 53, "the DSOs" should read -- the DS0s --.
Line 56, "of DSOs 772A" should read -- of DS0s 772A --.
Line 60, "remaining DSO. Thus" should read -- remaining DS0. Thus --

UNITED STATES PATENT AND TRADEMARK OFFICE
CERTIFICATE OF CORRECTION

PATENT NO. : 6,529,959 B1
DATED : March 4, 2003
INVENTOR(S) : Armistead et al.

It is certified that error appears in the above-identified patent and that said Letters Patent is hereby corrected as shown below:

Column 10 (cont'd),
Line 66, "block fiction can" should read -- block function can --.

Signed and Sealed this

Sixth Day of April, 2004

JON W. DUDAS
*Acting Director of the United States Patent and Trademark Office*